(12) United States Patent
Lind et al.

(10) Patent No.: US 8,432,118 B2
(45) Date of Patent: Apr. 30, 2013

(54) INVERTER AND A METHOD FOR CONTROLLING AN ELECTRIC MACHINE

(75) Inventors: Stephen Lind, Fargo, ND (US); Michael R. Schlichtmann, Fargo, ND (US); Orrin B. West, Fargo, ND (US); Kent D. Wanner, Fargo, ND (US)

(73) Assignee: Deere & Company, Moline, IL (US)

( * ) Notice: Subject to any disclaimer, the term of this patent is extended or adjusted under 35 U.S.C. 154(b) by 191 days.

(21) Appl. No.: 13/098,636

(22) Filed: May 2, 2011

(65) Prior Publication Data

US 2012/0280644 A1 Nov. 8, 2012

(51) Int. Cl.
*H02H 7/08* (2006.01)
(52) U.S. Cl.
USPC ........ 318/476; 318/254.1; 318/491; 318/701; 318/808
(58) Field of Classification Search .................. 318/139, 318/254.1, 254.2, 476, 491, 701, 808; 123/491
See application file for complete search history.

(56) References Cited

U.S. PATENT DOCUMENTS

| | | | | |
|---|---|---|---|---|
| 6,523,525 | B1 * | 2/2003 | Hawkins | 123/491 |
| 6,768,284 | B2 * | 7/2004 | Lee et al. | 318/808 |
| 8,046,179 | B2 * | 10/2011 | Campbell et al. | 702/58 |
| 8,203,302 | B2 * | 6/2012 | Ramu et al. | 318/701 |
| 2003/0130772 | A1 | 7/2003 | Yanagida et al. | |
| 2004/0062062 | A1 * | 4/2004 | Lee et al. | 363/37 |
| 2007/0200531 | A1 | 8/2007 | Armiroli et al. | |
| 2007/0249461 | A1 | 10/2007 | Tsuji et al. | |
| 2009/0200980 | A1 * | 8/2009 | Ramu et al. | 318/701 |
| 2010/0088047 | A1 * | 4/2010 | Campbell et al. | 702/58 |

OTHER PUBLICATIONS

The International Search Report and the Written Opinion of the International Searching Authority, dated Aug. 10, 2012 (10 pages).

\* cited by examiner

*Primary Examiner* — Paul Ip

(57) ABSTRACT

An inverter comprises output switches for generating motor phase currents for application to an electrical motor based on a commanded torque. A current sensor is arranged for detecting motor phase currents applied to the electrical motor by an inverter. A voltage sensor is configured for measuring voltages applied to the electrical motor by the inverter. An output port is capable of outputting output signals of the detected motor phase currents and measured voltages for processing by a vehicle controller. The output signals are suitable for input to a vehicle controller for determining whether or not to generate an override control signal. An input port is configured for receiving the override control signal from the vehicle controller. The input port is coupled to an override input module for switching off a supply of electrical energy to the electric motor.

19 Claims, 3 Drawing Sheets

INVERTER AND A METHOD FOR CONTROLLING AN ELECTRIC MACHINE

FIELD OF THE INVENTION

This invention relates to an inverter and a method for controlling an electric machine or motor.

BACKGROUND OF THE INVENTION

A controller or inverter provides output signals for controlling an electric machine or motor for a vehicle or other equipment. If the inverter or the electric machine malfunctions or has degraded performance, the output signal of the inverter may become inconsistent with a commanded torque supplied via a vehicle data bus (e.g., a controller area network data bus). In certain prior art, if the malfunction or performance degradation is not detected as a ground fault, short circuit or open circuit; a diagnostic system of the inverter may not identify the malfunction, which can temporarily mask or conceal an impending failure of the inverter or electric machine. An inverter or vehicle drive system that is susceptible to failure at an inopportune juncture might not comply with an applicable reliability standard or industrial safety standard. Thus, there is a need for an inverter and method for controlling an electric motor that supports control or shutdown of the inverter via a vehicle controller or other external controller to foster improved reliability.

SUMMARY OF THE INVENTION

In accordance with one embodiment, an inverter is capable of controlling an electric machine or motor. A data processor is adapted for receiving a commanded torque provided by a vehicle controller. The inverter comprises output switches for generating motor phase currents for application to an electrical motor based on the commanded torque. A current sensor is arranged for detecting motor phase currents applied to the electrical motor by an inverter. A voltage sensor is configured for measuring voltages applied to the electrical motor by the inverter. An output port is capable of outputting output signals of the detected motor phase currents and measured voltages for processing by a vehicle controller. The output signals are suitable for input to a vehicle controller for determining whether or not to generate an override control signal. An input port is configured for receiving the override control signal from the vehicle controller. The input port is coupled to an override input module for switching off a supply of electrical energy to the electric machine (e.g., via the inverter or its gate driver circuitry) based on an evaluation of the detected motor phase currents and measured voltages at the output port.

DESCRIPTION OF THE PREFERRED EMBODIMENTS

Figure 1:
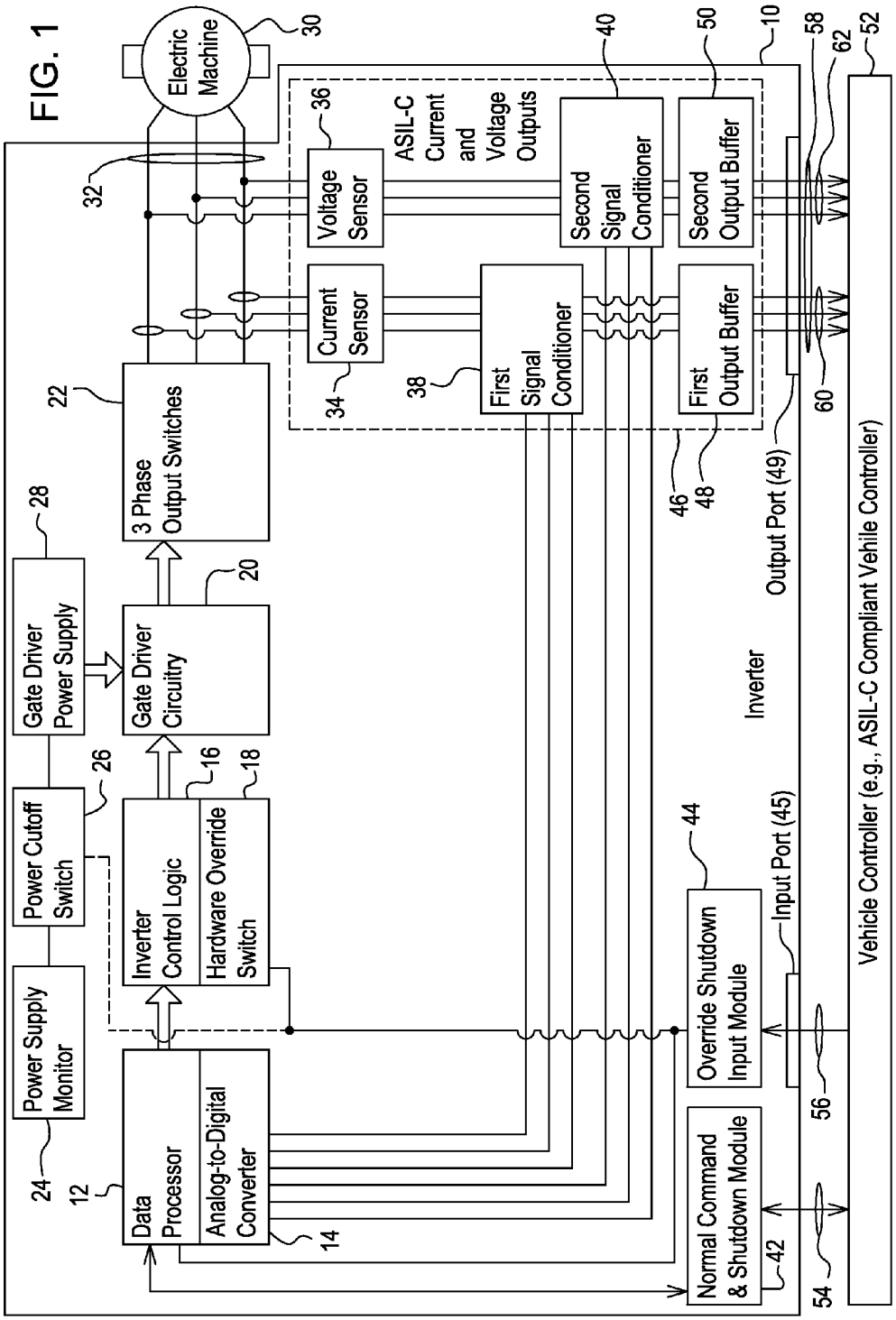
FIG. 1 is a block diagram of one embodiment of a system that comprises an inverter for controlling a machine or motor.

In accordance with one embodiment illustrated in FIG. 1, an inverter 10 is capable of controlling an electric machine 30 (e.g., motor). An inverter 10 is coupled to a vehicle controller 52 via one or more communication lines (54, 56, 58, 60, and 62). The communications lines may comprise one or more of the following: a vehicle data bus 54 (e.g., a Controller Area Network (CAN) data bus), a single conductor wire (e.g., 56), a transmission line, a cable, a coaxial cable, a fiber optic cable, a multi-conductor transmission line, and a multi-conductor cable (e.g., 60 or 62).

The inverter 10 comprises a normal command and shut-down module 42 for receiving a torque command via a vehicle controller 52 over a vehicle data bus 54. The normal command and shutdown module 42 is capable of communicating with a data port of the data processor 12. An input port 45 is coupled to an override shutdown input module 44. In turn, the override shutdown input module 44 communicates with a data port of the data processor 12 and a hardware override switch 18.

In an alternate embodiment, the override shutdown input module 44 communicates with a power cut-off switch 26 that controls a gate driver power supply 28. The gate driver power supply 28 provides electrical energy to the gate driver circuitry 20.

The data processor 12 comprises one or more data ports that receive data from an analog-to-digital converter 14. The received data represents sensed current data and sensed voltage data from the current sensor 34 and the voltage sensor 36 associated with an electric machine 30 (e.g., motor). The data processor 12 comprises an output that is coupled to inverter control logic 16, which comprises a circuit. The data processor 12 provides an output signal or output data to control inverter 10 control logic 16 that controls the modulation or operation of the gate driver circuitry 20.

An output of the inverter control logic 16 is coupled to an input of the gate driver circuitry 20. In turn, the output of the gate driver circuitry 20 is coupled to a multiphase (e.g., three phase) output switches 22. If the output switches 20 are disabled or switched off, the electrical energy is not provided to the electric machine 30, even if electrical energy is available at one more input terminals of the output switches 22.

The gate driver circuitry 20 provides a modulating signal (e.g., low-level alternating current signals or modulated pulses) for driving or controlling power the output switches 22. In one embodiment, the output switches 22 comprise switching semiconductors or switching transistors. The gate driver circuitry 20 may apply a control signal to the control terminal of each output switch, where the control terminal may comprise a base of a transistor or the gate of a field effect transistor, for example. The output of the output switches 22 may comprise one or more alternating current signals or pulse-width modulated signals that are applied to different phases of an electric machine 30 (e.g., motor). As illustrated in FIG. 1, three output phases of the multiphase output switches 22 are shown.

A current sensor 34 and a voltage sensor 36 may be coupled to the output phases of the output switches 22 for measurement of the current or voltage associated with the electric machine 30 (e.g., motor). Although the current sensor 34 is shown as inductively coupled to the conductors 32 in FIG. 1, the current sensor 34 may be directly connected to the conductors 32 in an alternate embodiment. If the electric machine 30 is a motor, the current sensor 34 or voltage sensor 36 measures the input current or input voltages applied to winding of the motor 30, respectively. If the electric machine 30 is a generator or alternator, the current sensor 34 or voltage sensor 36 measures the output current or output voltages, respectively, outputted from the winding of the generator when a rotor of the generator is rotated by a rotational force.

An output of the current sensor 34 is coupled to an input of a first signal conditioner 38. Similarly, an output of the voltage sensor 36 is coupled to an input of a second signal conditioner 40. Each signal conditioner (38, 40) comprises a filtering and amplification circuit to facilitate noise reduction and scaling of the sensed voltage and current signals.

The first signal conditioner 38 provides conditioned signals to a first output buffer 48. The second signal conditioner 40 provides conditioned signals to a second output buffer 50. The first output buffer 48 and second output buffer 50 may comprise an analog amplification circuit or another circuit for adjusting an output level of the conditioned signals (e.g., sensed current and measured voltage) to a target output level or range for reliability or increased immunity to electromagnetic noise. The first output buffer 48 and the second output buffer 50 or coupled to an output port 49. The output port 49 comprises an interface for providing sensed current and measured voltages from the vehicle controller 52.

In one embodiment, a data processor 12 is adapted for receiving a commanded torque provided by a vehicle controller 52. The inverter 10 or data processor 12 converts the commanded torque into corresponding current and voltages for application to the electric machine 30 or motor. The inverter 10 comprises output switches 22 for generating motor phase currents for application to an electrical motor 30 based on the commanded torque. The output switches 22 are coupled to the motor 30 via one or more conductors 32, such as one conductor per phase. A current sensor 34 is arranged for detecting motor phase currents applied to the electrical motor 30 by an inverter 10. A voltage sensor 36 is configured for measuring voltages applied to the electrical motor 30 by the inverter 10. An output port 49 is capable of outputting output signals of the detected motor 30 phase currents and measured voltages for processing by a vehicle controller 52. The output signals are suitable for input to a vehicle controller 52 for determining whether or not to generate an override control signal (e.g., for disabling or switching off the inverter 10, or a portion thereof). An input port 45 is configured for receiving the override control signal from the vehicle controller 52. The input port 45 is coupled to an override shutdown input module 44 for switching off a supply of electrical energy to the electric machine 30 (e.g., via the inverter 10) solely based on an evaluation of the detected motor phase currents and measured voltages at the output port 49.

In one embodiment, a data port of the data processor 12 is coupled to the vehicle data bus 54 (e.g., CAN data bus) via the normal command and shutdown module 42, where the shutdown module receives the commanded torque from a vehicle controller 52 coupled to the vehicle data bus 54 and forwards the commanded torque to the data processor 12. In one configuration, the output port 45 comprises a data port with at least one conductor per phase of the electrical motor 30, and where the output port 49 provides analog signals. In one schema, the input port 45 comprises a single conductor separate from the vehicle data bus 54, although other configurations are possible and fall within the scope of the appended claims.

In one embodiment, certain circuitry, embedded software, or both within the inverter 10 is Automotive Safety Integrity Level compliant (e.g., ASIL-C compliant, International Electrotechnical Commission (IEC) 61508). ASIL compliant circuitry (e.g., ASIL-C compliant circuitry or IEC 61508 compliant circuitry) may use components with known reliability or test results, or military specifications, or redundant configurations to foster improved reliability. FIG. 1 shows the ASIL compliant circuitry, software, or systems (e.g., ASIL-C compliant circuitry, software or systems) that are associated with (1) the sensed current and voltage outputs 46, (2) the normal command and shutdown module 42 and (3) the override shutdown input module 44.

Further, the inverter 10 is well suited for compliance with various safety standards (e.g., EIC 61508 safety standard and the International Standards Organization (ISO) 26262 safety standard) without adding any torque sensors to directly measure the torque of the electric motor 30 or machine. Instead, the inverter 10 advantageously features an input port 45 and one or more output ports 49 that cooperate with the vehicle controller 52, such that the vehicle controller 52 can estimate torque or other electric machine performance parameters, or inverter diagnostic data, from measured phase currents and measured phase voltages.

In the block 46 for the current and voltage outputs, a first signal conditioner 38 and a second signal conditioner 40 are coupled to the current sensor 34 and the voltage sensor 36, respectively. In one embodiment, the first and second signal conditioners (38, 40) are arranged to filter and amplify the sensed voltages and currents with ASIL C-compliant circuitry. Further, in one embodiment, the current sensor 34 and the voltage sensor 36 comprise ASIL-C compliant circuitry.

As illustrated in FIG. 1, a power supply monitor 24 is coupled to a power cutoff switch 26. In turn, the power cutoff switch 26 is coupled to a gate driver power supply 28.

In a primary configuration, the power cutoff switch 26 comprises a switch for controlling provision of electrical energy to a gate driver circuitry 20 that drives the output switches 22. The override shutdown input module 44 (also referred to as the override module) is coupled to the input port 45 and the switch 26. The override module 44 controls the switch 26 to override any commanded torque inputted to the inverter 10 via the vehicle data bus 54.

Figure 2:
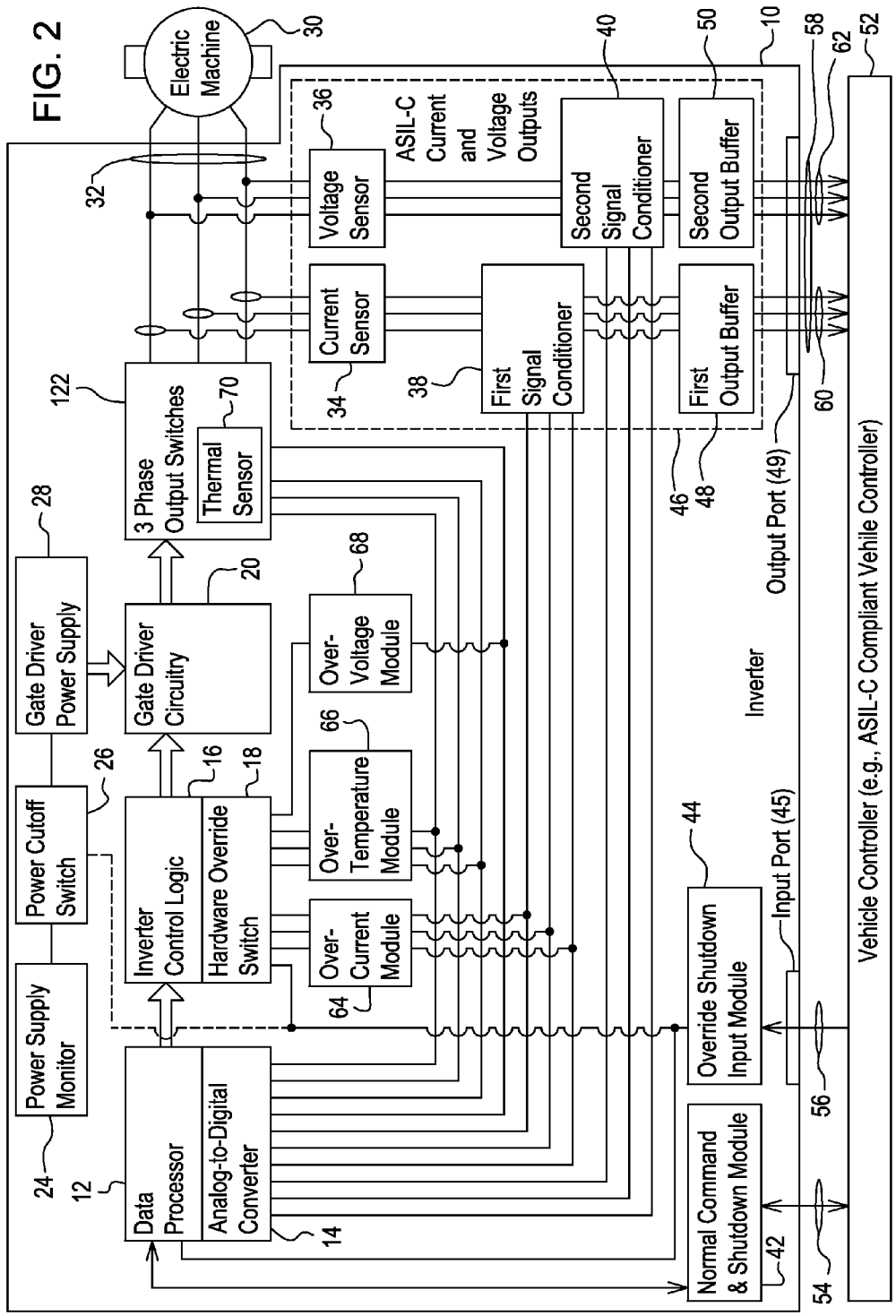
FIG. 2 is a block diagram of another embodiment of a system that comprises an inverter for controlling a machine or motor.

The system of FIG. 2 is similar to the system (e.g. electric drive system) of FIG. 1, except the system of FIG. 2 further comprises an over-current module 64, an over-temperature module 66, and an over-voltage module 68. Further, the output switches 122 are similar to output switches 22, with the addition of the thermal sensor 70 for providing a sensor signal or data to over-temperature module 66. Like reference numbers in FIG. 1 and FIG. 2 indicate like elements.

In FIG. 2, the power cutoff switch 26 comprises a switch for controlling provision of electrical energy to a gate driver circuitry 20 that drives the output switches 22. The override module or override shutdown input module 44 is coupled to the input port 45 and the switch 26. Further, the override module 44 controls the switch 26 independently of any shutdown triggered by an over-current module 64, an over-voltage module 68, or an over-temperature module 66 (e.g., thermal module) within the inverter 10.

In one embodiment, the over-current module 64 may comprise a current comparator or another device for comparing one or more measured phase currents to corresponding reference current levels. If the measured phase current exceeds a reference current level; the over-current module 64 triggers a logic output signal, a disable signal, or a disable command. The over-current module 64 receives inputs of the measured phase currents from the current sensor 34. For example, the over-current module 64 receives inputs of the measured phase currents via the first signal conditioner 38. The over-current module 64 may output a disable signal or disable command to disable the inverter 10 or to switch off one or more phases of the inverter 10 control logic 16 or the gate driver circuitry 20.

In one embodiment, the over-voltage module 68 may comprise a voltage comparator, a differential amplifier or another device for comparing a direct current (DC) bus voltage, or another voltage measurement to the inverter 10, to a reference voltage level. If the measured voltage exceeds a reference voltage level; the over-voltage module triggers a logic output signal, a disable signal, or a disable command. The over-voltage module 68 receives an input of the measured DC bus voltage from one or more voltage sensors 36 associated with the direct current bus or the three phase output switches 22. The over-voltage module 68 may output a disable signal or disable command to disable the inverter 10 or to switch off the gate driver circuitry 20, the three phase output switches 22, or both.

In one embodiment, the over-temperature module 66 (e.g., thermal module) comprises a thermistor or other thermal sensor 70 that is associated with the three phase output switches 22 or the electric machine 30. For example, the thermal sensor 70 may be mounted on a heat sink associated with one or more switching devices within the output switches 22. If the three phase output switches 22 or the electric machine 30 exceeds a certain threshold temperature, as indicated by a signal reading of the thermal sensor 70, the over-temperature module 66 generates a disable signal or disable command to turn off one or more phases of the three phase output switches 22 to disable the gate driver circuitry 20, for example.

Figure 3:
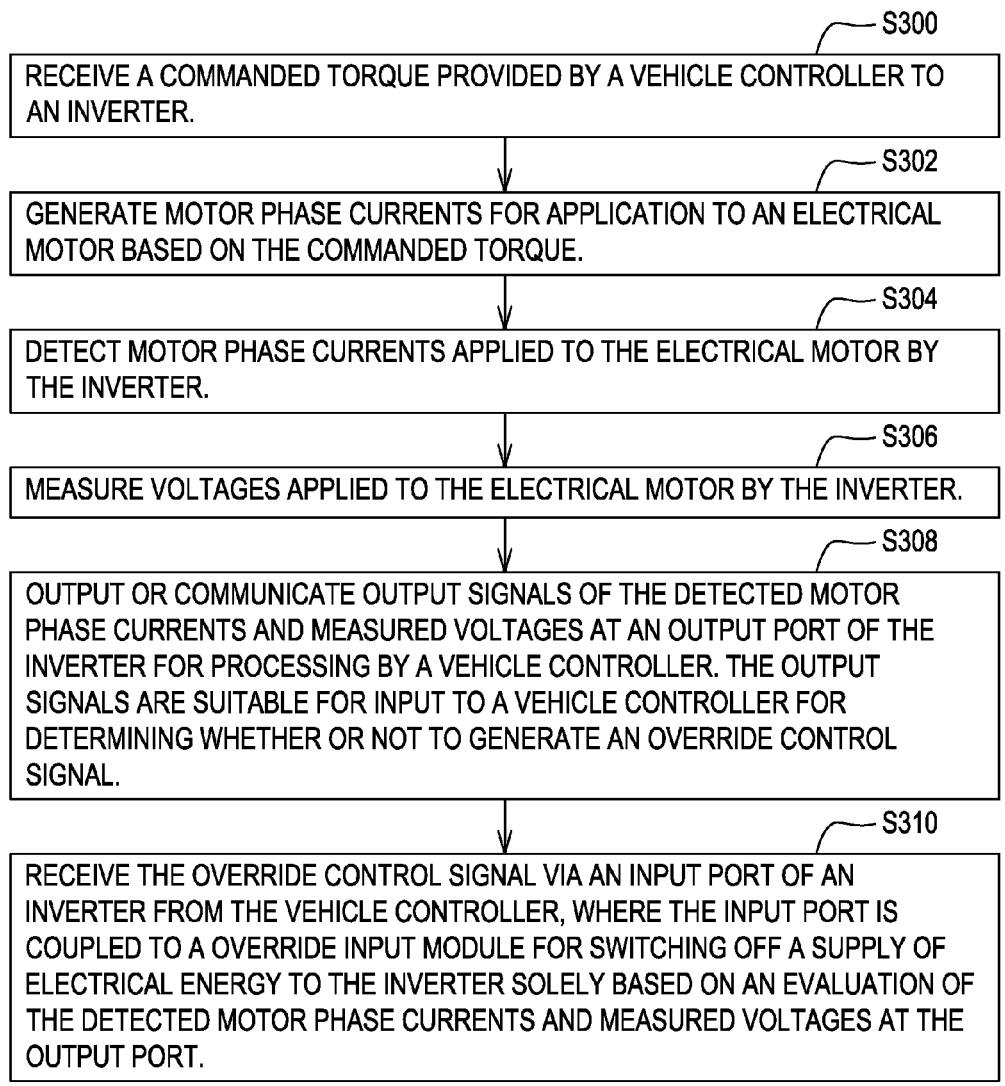
FIG. 3 is a flow chart of one example of a method for controlling a machine or motor.

FIG. 3 illustrates a flow chart for a method for controlling an electric machine 30 or motor. The method of FIG. 3 begins in step S300.

In step S300, a normal command and shutdown module 42, a data processor 12, or the inverter 10 receives a commanded torque provided by a vehicle controller 52. For example, the commanded torque may be expressed as a percentage, ratio or faction of a reference torque value or maximum torque of an electric motor 30. The vehicle controller 52 may transmit the torque to the inverter 10 via a vehicle data bus 54, such as a controller area network (CAN) data bus.

In step S302, the data processor 12 or inverter 10 generates motor 30 phase currents for application to an electrical motor 30 based on the commanded torque. For example, the data processor 12 may convert the commanded torque into equivalent current control data, voltage control data, or both for control of the electric motor 30 consistent with a torque versus speed and applied current relationship, or other motor reference data. More current may be required to start an induction motor 30 at a low rotor speed than to maintain a higher rotor speed, for instance. The motor reference data may be organized as one or more look-up tables, databases, files, inverted files or other data structures that facilitate determining of generated motor phase currents associated with corresponding commanded torque.

In step S304, a current sensor 34 or inverter 10 detects motor phase currents applied to the electrical motor 30 by an inverter 10. For example, the current sensor 34 may be coupled to the output of the power switches that feed the electric motor 30. For a three phase motor 30, the current sensor 34 may be coupled to each phase to sense the current within each phase connection to the motor 30. After the current sensor 34 senses the sensed current, the first signal conditioner 38 filters, amplifies, or otherwise conditions the sensed current for further processing. The first signal conditioner 38 may filter the sensed current to reduce or attenuate radio frequency interference and noise or local electrical interference. Local electrical interference may be generated by the electric motor 30 or machine, for example.

In step S306, a voltage sensor 36 measures voltages applied to the electrical motor 30 by the inverter 10. For example, the voltage sensor 36 may be coupled to the output of the power switches (22 or 122) that feed the electric motor 30. For a three phase motor 30, the voltage sensor 36 may be coupled to each phase to sense the voltage within each phase connection to the motor 30. After the voltage sensor 36 senses the sensed voltage, the first signal conditioner 38 filters, amplifies, or otherwise conditions the sensed voltage for further processing. The second signal conditioner 40 may filter the sensed current to reduce or attenuate radio frequency interference and noise or local electrical interference. Local electrical interference may be generated by the electric motor 30 or machine, for example.

In step S308, the output buffers (48, 50) or the inverter 10 communicates output signals of the detected motor phase currents and measured voltages at an output port 49 of an inverter 10 for processing by a vehicle controller 52. The output signals of the output buffers (48, 50) are suitable for input to a vehicle controller 52 for determining whether or not to generate an override control signal. The amplified or buffered output signals may be more resistant to or immune to corruption from electromagnetic interference, noise, or local electrical interference, than lower level signals because the signal-to-noise ratio is enhanced.

In one embodiment, the output signals may comprise analog output signals, such that greater voltage levels can be used than typically used for digital signal logic levels for transistor-to-transistor logic, for complementary metal oxide semiconductors or otherwise. For example, the output signals at first conductors 60 and second conductors 62 may range in amplitude from negative 10 volts to positive ten volts direct current, whereas transistor-to-transistor logic may use zero to five volts.

Step S308 may be executed in accordance with various procedures, which may be applied separately or cumulatively. Under a first procedure, first the vehicle controller 52 converts the measured phase currents (e.g., received via the first output buffer 48 and the first conductors 60) into corresponding measured quadrature axis current and measured direct axis current. Second, the vehicle controller 52 converts the read commanded torque into corresponding commanded quadrature axis current and commanded direct axis current. Third, the vehicle controller 52 generates the override control signal if the measured quadrature axis current and measured direct axis current differs from the commanded quadrature axis current and commanded direct axis current, respectively, by more than a threshold current deviation.

Under a second procedure, the threshold current deviation for the first procedure comprises approximately ten percent of the commanded quadrature axis current or the commanded direct axis current. Approximately means plus or minus five percent of any given value.

Under a third procedure, first the vehicle controller 52 converts the measured phase currents and measured phase voltages into estimated actual torque. Second, the vehicle controllers 52 compare the estimated actual torque to the commanded torque to determine whether the estimated actual torque is plausible or consistent with the commanded torque. The commanded torque is provided by the vehicle controller 52, typically in response to a vehicle operator interacting with a pedal, throttle or other user interface. If the estimated actual torque differs by more than a torque threshold (e.g., approximately ten percent of commanded torque), the vehicle controller 52 may generate an override control signal (e.g., shutdown command) to shut down the inverter 10, the gate driver circuitry 20, or the output switches (22 or 122) for example.

Under a fourth procedure, the inverter 10 or its data processor 12 may first estimate a first estimated torque (e.g., inverter-estimated torque) independently of a second estimated torque (e.g., vehicle controller-estimated torque) determined by the vehicle controller 52. Second, the inverter 10, or its data processor 12, transmits (to the controller 52) the first estimated torque, via the data bus 54 (e.g., via the normal command and shutdown module 42) along with the measured phase currents and measured phase voltages via the output port 49. Third, the vehicle controller 52 may use the commanded torque, the first-estimated torque, and the second-estimated torque to determine whether or not the inverter 10 and motor 30 are deviating from the commanded torque or other performance criterion, where the vehicle torque is based on the measured phase currents and measured phase voltages. Fourth, the vehicle controller 52 may use a weighted average or mean or unweighted average of the first-estimated torque and the second-estimated torque to compare to the commanded torque or other performance criterion. Fifth, the vehicle controller 52 may determine if the average or weighted average estimated torque differs by more than a torque threshold (e.g., ten percent of commanded torque), the vehicle controller 52 may generate an override control signal (e.g., shutdown command) for shutting down the inverter 10, the gate driver circuitry 20, or the output switches (22 or 122), for example In step S310, an inverter 10 or override shutdown input module 44 receives the override control signal (or shutdown data command) via an input port 45 of an inverter 10 from the vehicle controller 52. The input port 45 is coupled to an override shutdown input module 44 for switching off a supply of electrical energy to the electric machine 30 (e.g., via the inverter 10) solely based on an evaluation of the detected motor phase currents and measured voltages at the output port 49. Step S310 may be executed in accordance with various techniques, which may be applied alternately or cumulatively.

Under a first technique, the inverter 10 or override shutdown input module 44 receives the override control signal if an estimated actual operational torque differs by at least a threshold deviation from the read commanded torque, where the estimated actual operational torque is based on one or more of the following: (1) the detected motor phase currents from current sensor 34 (e.g., measured at conductors 32), (2) the measured voltages from voltage sensor 36 (e.g., measured at conductors 32), and (3) an operational torque versus speed, (4) operational torque versus speed and current relationship of the electrical motor 30. The read commanded torque is provided by the vehicle controller 52, in response to a vehicle operator's interaction with a floor pedal, throttle, or other user interface.

Under a second technique, the threshold deviation, referenced in the first technique, comprises approximately ten percent of the read commanded torque.

Under a third technique, the inverter 10 is configured to switch off a supply of electrical energy to the electric machine 30 or to a gate driver circuitry 20 of the inverter 10 upon receipt of the override control signal.

Under a fourth technique, the override control signal overrides or supersedes any torque that is received via the vehicle data bus 54.

Under a fifth technique, the override control signal is capable of transmission to the input port 45 via a single conductor or dual conductor cable separate from a vehicle data bus 54.

As previously explained, the vehicle control unit can switch off the inverter 10 via a command sent to the normal command and shutdown module 42 via the vehicle data bus 54 (e.g., CAN data bus), or the vehicle controller 52 can switch off the inverter 10 via a command signal sent to the override shutdown input module 44 via the input port 45. Thus, the vehicle system (10, 30, and 52, collectively) supports two independent paths for the vehicle controller 52 to switch off the inverter 10 to reduce torque of the motor shaft of motor 30 to zero. The former path may depend upon software, whereas the latter path can be independent of any software as a direct electronic hardware-controlled shutdown to reduce the torque of the motor shaft of motor 30 to zero. Neither of the two paths affects the ability of the inverter 10 itself to shut-down because the inverter 10 detects an overcurrent condition, a thermal condition, or an over-voltage condition, independent of the vehicle controller 52.

The system and method facilitates elimination or reduction in unintended acceleration events, uncommanded torque events, or other possible discrepancies between commanded torque and actual torque generated by the electric motor 30 at any given instant.

The system and method is well-suited for providing an inverter 10 that readily interfaces with an ASIL-compliant vehicle controller 52 to form an integral ASIL-compliant (e.g., ASIL C-compliant) electric drive system. Similarly, the system and method may be applied to the IEC 61508 safety standard for electric drive systems, the proposed ISO 26262 safety standard, or other safety standards for electric drive systems without adding additional torque sensors for torque monitoring. The elimination of need for torque sensors tends to improve reliability and reduce the cost and system complexity for an electric drive system.

Signals for current and voltage measurements are made accessible to the vehicle controller 52, where appropriate torque monitoring, inverter diagnostics, fault handling decisions and shut down commands are managed. The current and voltage measurements are integrated into the inverter 10 to reduce electromagnetic interference or noise and to buffer the signal with enhanced signal strength output. Accordingly, the buffered signal tends to have greater immunity to radio frequency interference or noise from the vehicle, electric machine 30, or other sources.

The IEC 61508 standard, entitled "Functional safety of electrical/electronic/programmable electronic safety-related systems", is a functional safety standard applicable to all kinds of industrial applications. The standard has its origins in the process control industry sector, and covers the complete safety life cycle. This standard defines four Safety Integrity Levels, or SILs, from SIL 1 to SIL 4, with SIL 4 being the highest level of safety requirements.

The proposed ISO 26262 standard is a Functional Safety standard which is currently under development, entitled "Road vehicles—Functional safety". ISO 26262 is somewhat analogous to the Functional Safety standard IEC 61508 for Automotive Electric/Electronic Systems. For example, proposed ISO 26262 defines four Automotive Safety Integrity Levels, or ASILs, labeled as ASIL A through ASIL D. ASIL A has the least stringent requirements, while ASIL D has the most stringent. (These ASIL levels do not correspond directly to SIL levels 1-4 of the IEC 61508 standard). These levels are defined by three key metrics, which are the probability that a system will violate a safety goal (PVSG), a single point fault metric (SPFM), and a latent, or hidden, fault metric (LFM). Although, at the time of preparation of this document, the proposed ISO 26262 standard is not yet released, many original equipment manufacturers have goals to provide systems/vehicles which meet ASIL C or ASIL D, or the like.

Because some of the initial applications planned for the system and method are related to electric vehicles, the diagrams provided and some of the textual descriptions may refer specifically to the ASIL levels of ISO 26262 (and in particular, to ASIL C). However, the system and method can be applied to use of electric motors and inverters in industrial applications, as well, and so IEC 61508 or other standards may be applied.

Having described the preferred embodiment, it will become apparent that various modifications can be made without departing from the scope of the invention as defined in the accompanying claims.

The following is claimed:

1. A method for controlling an electric motor, the method comprising:
   receiving a commanded torque provided by a vehicle controller,
   generating motor phase currents for application to an electric motor based on the commanded torque;
   detecting motor phase currents applied to the electric motor by an inverter;
   measuring voltages applied to the electric motor by the inverter;
   outputting output signals of the detected motor phase currents and measured voltages at an output port of an inverter for processing by the vehicle controller; the output signals suitable for input to the vehicle controller for determining whether or not to generate an override control signal; and
   receiving the override control signal via an input port of an inverter from the vehicle controller, the input port coupled to an override input module for switching off a supply of electrical energy to the electric motor solely based on an evaluation of the detected motor phase currents and measured voltages at the output port.

2. The method according to claim 1 wherein the receiving further comprises receiving the override control signal if an estimated actual operational torque differs by at least a threshold deviation from the read commanded torque, where the estimated actual operational torque is based on the detected motor phase currents, the measured voltages, and at least one of operational torque versus current relationship and a operational torque versus voltage relationship of the electric motor.

3. The method according to claim 2 wherein the threshold deviation comprises approximately ten percent of the read commanded torque.

4. The method according to claim 2 further comprising:
   switching off a supply of electrical energy to a gate driver circuit of the inverter upon receipt of the override control signal.

5. The method according to claim 1 wherein the override control signal overrides or supersedes any commanded torque that is received via the vehicle data bus.

6. The method according to claim 1 wherein the override control signal is capable of transmission to the input port via a single conductor or dual conductor cable separate from a vehicle data bus.

7. The method according to claim 1 further comprising:
   converting the measured phase currents into corresponding measured quadrature axis current and direct axis current;
   converting the read commanded torque into corresponding commanded quadrature axis current and direct axis current;
   generating the override control signal if the measured quadrature axis current and measured direct axis current differs from the commanded quadrature axis current and commanded direct axis current, respectively, by more than a threshold current deviation.

8. The method according to claim 7 wherein the threshold current deviation comprises approximately ten percent of the commanded quadrature axis current or the commanded direct axis current.

9. The method according to claim 1 wherein the receiving further comprises receiving the override control signal if an average estimated torque differs by at least a threshold deviation from the read commanded torque, where the average estimated torque is based on a weighted average of a first estimated operational torque determined within the inverter and a second estimated operational torque determined within the vehicle controller, where both the first estimated operational torque and the second estimated operational torque are based on the detected motor phase currents, the measured voltages.

10. An inverter or controller for an electric motor, the inverter comprising:
    a data processor for receiving a commanded torque provided by a vehicle controller;
    output switches for generating motor phase currents for application to an electric motor based on the commanded torque;
    a current sensor for detecting motor phase currents applied to the electric motor by an inverter;
    a voltage sensor for measuring voltages applied to the electric motor by the inverter;
    an output port for outputting output signals of the detected motor phase currents and measured voltages for processing by the vehicle controller; the output signals suitable for input to the vehicle controller for determining whether or not to generate an override control signal; and
    an input port for receiving the override control signal from the vehicle controller, the input port coupled to an override input module for switching off a supply of electrical energy to electric motor solely based on an evaluation of the detected motor phase currents and measured voltages at the output port.

11. The system according to claim 10 further comprising:
    a data port connected to the vehicle data bus for receiving the commanded torque from a vehicle controller coupled to the vehicle data bus.

12. The system according to claim 10 wherein the output data port comprises at least one conductor per phase of the electric motor, and where the output data port provides analog signals.

13. The system according to claim 10 wherein the input data port comprises a single conductor separate from the vehicle data bus.

14. The system according to claim 10 further comprising:
    a plurality of signal conditioners coupled to the voltage sensor and the current sensor, the signal conditions filtering and amplifying the sensed voltages and currents with ASIL C-compliant circuitry.

15. The system according to claim 10 wherein the current sensor and the voltage sensor comprise ASIL-C compliant circuitry.

16. The system according to claim 10 further comprising:
    a switch for controlling provision of electrical energy to a gate driver circuit that drives the output switches; and
    an override module coupled to the input port and the switch, the override module controlling the switch to override any commanded torque inputted to the inverter via the vehicle data bus.

17. The system according to claim 10 further comprising:
    a switch for controlling provision of electrical energy to a gate driver circuit that drives the output switches; and an override module coupled to the input port and the switch, the override module controlling the switch independently of any shutdown triggered by an over-current shutdown module, an over-voltage shut-down module, or a thermal shut-down module shut-down module within the inverter.

18. The method according to claim 10 further comprising:
the input port adapted to receive the override control signal if an estimated actual operational torque differs by at least a threshold deviation from the read commanded torque, where the estimated actual operational torque is based on the detected motor phase currents, the measured voltages, and at least one of operational torque versus current relationship and a operational torque versus voltage relationship of the electric motor.

19. The system according to claim 10 further comprising:
the input port adapted to receive an override control signal if an average estimated torque differs by at least a threshold deviation from the read commanded torque, where the average estimated torque is based on a weighted average of a first estimated operational torque determined within the inverter and a second estimated operational torque determined within the vehicle controller, where both the first estimated operational torque and the second estimated operational torque are based on the detected motor phase currents, the measured voltages.

* * * * *